United States Patent [19]

Roney

[11] Patent Number: 4,623,196

[45] Date of Patent: Nov. 18, 1986

[54] SAFETY SEAT ASSEMBLY FOR INDUSTRIAL VEHICLES

[75] Inventor: Thomas W. Roney, Battle Creek, Mich.

[73] Assignee: Clark Equipment Company, South Bend, Ind.

[21] Appl. No.: 532,268

[22] Filed: Sep. 14, 1983

[51] Int. Cl.[4] .............................................. B60N 1/02

[52] U.S. Cl. ................................ 297/464; 296/65 A; 297/216

[58] Field of Search ............... 297/464, 468, 296, 473, 297/216, 445; 296/65 A; 248/429

[56] References Cited

U.S. PATENT DOCUMENTS

| | | | |
|---|---|---|---|
| 2,628,657 | 2/1953 | Orrick, Jr. | 248/429 |
| 3,627,379 | 12/1971 | Faust | 297/216 X |
| 3,794,382 | 2/1974 | Bloomfield et al. | 297/216 X |
| 3,922,030 | 11/1975 | Stedman | 296/65 A |
| 4,422,691 | 12/1983 | Vogel | 297/445 X |

*Primary Examiner*—James T. McCall
*Attorney, Agent, or Firm*—John C. Wiessler

[57] ABSTRACT

A safety seat assembly for use with industrial vehicles, such as forklift trucks, which protects operators from being ejected out of the seat or thrown excessively from side to side in the seat in the event of a lateral overturn or other accidental or unintended erratic maneuver. The safety seat assembly includes a seat member and a back support member mounted generally perpendicular to the seat member and having protective wings on opposite sides positioned in the approximate area of the upper arms of a normal size adult operator. The side portions of the wings may be of a generally rectangular or frustoconical shape and preferably have a frame near the periphery thereof and an opening near the forward end of the wing to minimize visual restriction by the wings and to provide a hand-hold for the operator as he enters and leaves the truck. The safety seat assembly normally includes a safety belt to restrain the lower part of the body of the operator and may consist essentially of a conventional vehicle safety belt having two parts with the parts connected on opposite sides of the assembly near the rear of the seat and having a latch to connect the two parts in the hip region of the operator. The seat assembly is so designed and constructed that it can effectively be used with a variety of industrial vehicles and in various positions or locations in or on the vehicle.

24 Claims, 6 Drawing Figures

16
14
20
10
100
18
12

66
64
90
20
32
70
92

108
112
122
34
102
68
128
52
36
30
114
110
48
124
104
126
130

66
84
90
72
76
32
74
80
52
30
34
46
118
42

70
68
64
94
68

96
36
34
30
118
120
106

60
64
74
32
72
68
62
52
106
66
70
84
86
48
30

66
60
70
62
84
64
72
32
68
86
76
78
80
74
82
52
34
36
48
50
118
120
40
42
30
46
44
106

SAFETY SEAT ASSEMBLY FOR INDUSTRIAL VEHICLES

BACKGROUND OF THE INVENTION

1. Field of the Invention

This invention relates to the field of industrial machines such as forklift trucks, and more particularly to an occupant safety seat assembly for protecting the operator.

2. Description of the Prior Art

While extensive research has been done in the field of restraining means for protecting consumer motor vehicle operators, the problem has been to find a suitable device for industrial machines that will be accepted and used by the operator without overly restricting his ingress and egress, visibility, and upper body movement, all critical for safe operation, especially for the factory and warehouse uses of lift trucks employing an overhead guard. For years, seat belts have been proposed. Lap belts, shoulder harnesses, and three point automotive-type belts have the chief disadvantage, for a typical lift truck where the width is narrow and the seat is offset to one side of the truck centerline, that the upper body of the operator can still be thrust to one side by lateral forces, in spite of the belt, possibly causing injury to the operator who comes into contact with an object, or the truck itself.

Side screens or doors on the overhead guard would contain the operator, but are easily defeated or removed, and often prove detrimental because new hazards are created due to the possibility of underside impact with the head/overhead guard and reduced visibility. Loads are not properly spotted, or factory workers not seen in time, resulting in injury to bystanders from falling boxes or to pedestrians run down in plant aisles.

In cases of misuse, the truck may tip upon two wheels or, when operated carelessly, even upset, and unless restrained inside the overhead guard, the operator is subject to injury. The hazard then is likely to be the overhead guard itself. But operation of the lift truck without its overhead guard, to avoid injury to the few careless operators who misuse the truck, would expose the many careful operators to far greater hazards from falling loads in their normal work environments; thus, no safety standard calls for seat belts or side screens, but the overhead guard is required by all safety codes applicable to lift trucks except in strictly defined, low lift uses. There remains the problem, then, that no acceptable safety seat arrangement has heretofore been invented for use with an overhead guard on industrial machines, such as forklift trucks.

SUMMARY OF THE INVENTION

It is, therefore, one of the principal objects of the present invention to provide an occupant safety seat assembly which protects the operator of a machine by providing upper body containment in combination with lower body restraint. The combination is critical, in that it does not overly restrict the movements or obscure the vision of the operator, or otherwise impair his ability to operate the machine safely, providing the required upper body mobility within the lateral profile of the machine, while the lower body restraint restricts freedom of movement to a larger degree below the waist.

Another object of the present invention is to provide such a seat in connection with a lift truck having an overhead guard in which the seat affords freedom of movement to a degree outside the lateral profile of the guard when desired, but also prevents the operator's upper body from being thrust outside the guard when forces acting on the truck laterally are higher than occur in normal operations.

A further object of the present invention is to provide a safety seat which includes a catch for a hinged seat deck, usually to allow access to an engine compartment, but in addition the catch and deck are designed to withstand the forces generated with the operator secured on the seat in the event of a crash or upset.

A still further object of the present invention is to provide a seat having an upper passive lateral containment device asymmetrically offset relative to the seat back, and opposite the direction the seat is itself offset relative to the truck centerline. This device is intended for use in conjunction with a lower, actively applied restraint which fastens reasonably snugly about the lower body, restraining the operator to a large degree from movement in the hip area.

These and other objects are attained by the present invention, which relates to a safety seat assembly for protecting operators of industrial vehicles, such as forklift trucks, from being ejected from the seat or thrown excessively from side to side in the seat in the event of a lateral overturn or other accidental or unintended erratic maneuver. The safety seat assembly includes a seat member and a back support member mounted generally perpendicular to the seat member and having protective wings on opposite sides, positioned in the approximate area of the upper arms of a normal size adult operator. The side portions of the wings may be generally of a rectangular or frustoconical shape, and preferably have a frame near the periphery thereof and an opening near the forward end of the wing to minimize visual restriction by the wings and to provide a hand-hold for the operator as he enters and leaves the truck. The safety seat assembly normally includes a safety belt to restrain the lower part of the body of the operator and may consist essentially of a conventional vehicle safety belt having two parts, with the parts connected on opposite sides of the assembly near the rear of the seat and having a latch to connect the two parts in the hip region of the operator. The seat assembly is so designed and constructed that it can be used effectively with a variety of industrial vehicles and in various positions or locations in or on the vehicle.

DETAILED DESCRIPTION OF THE PREFERRED EMBODIMENT

Figure 1:
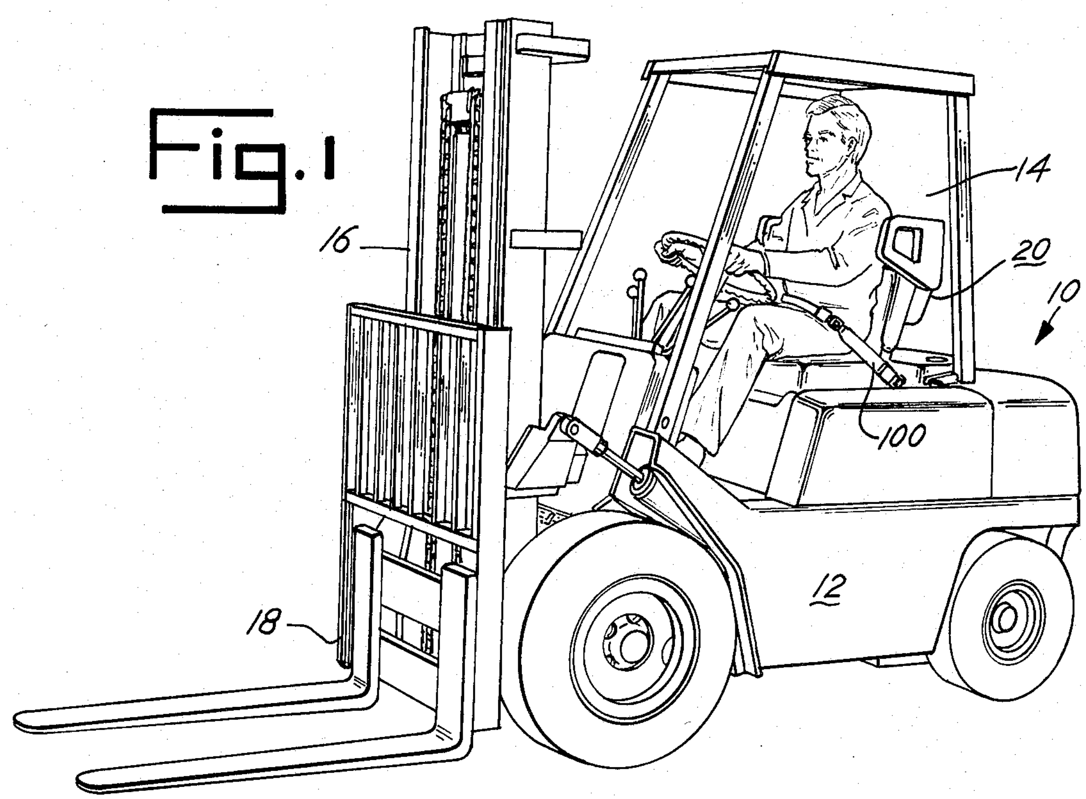
FIG. 1 is a perspective view of a forklift truck in which the present safety seat assembly has been installed and is in use by an operator.
Figure 2:
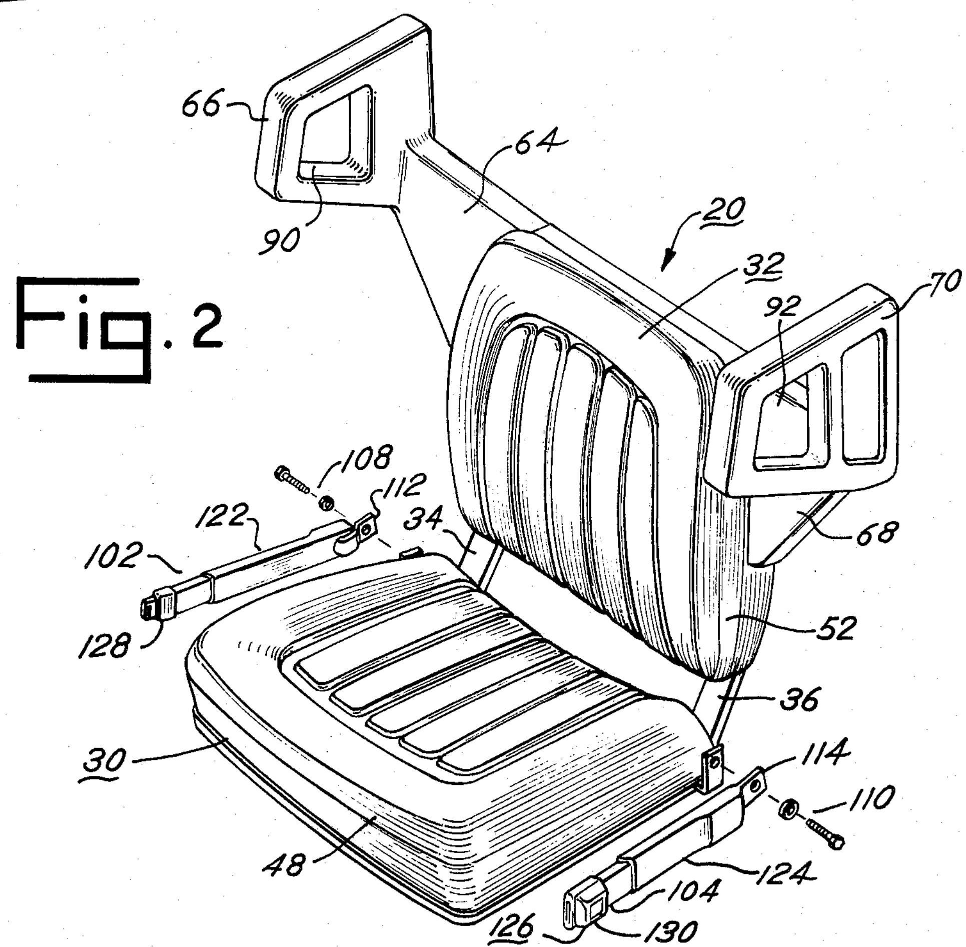
FIG. 2 is a perspective view of the safety seat assembly seen in FIG. 1, with the parts of the safety belt shown in exploded view to more effectively illustrate the structure.
Figure 3:
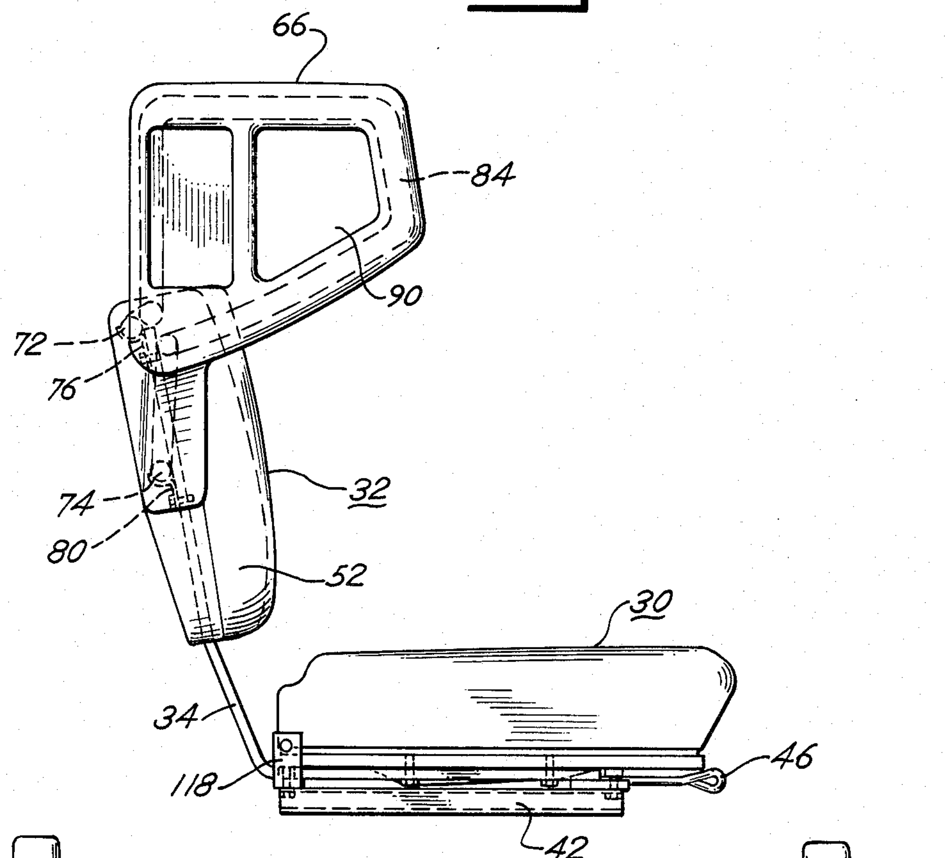
FIG. 3 is a side elevational view of the safety seat assembly seen in the preceding figures.
Figure 4:
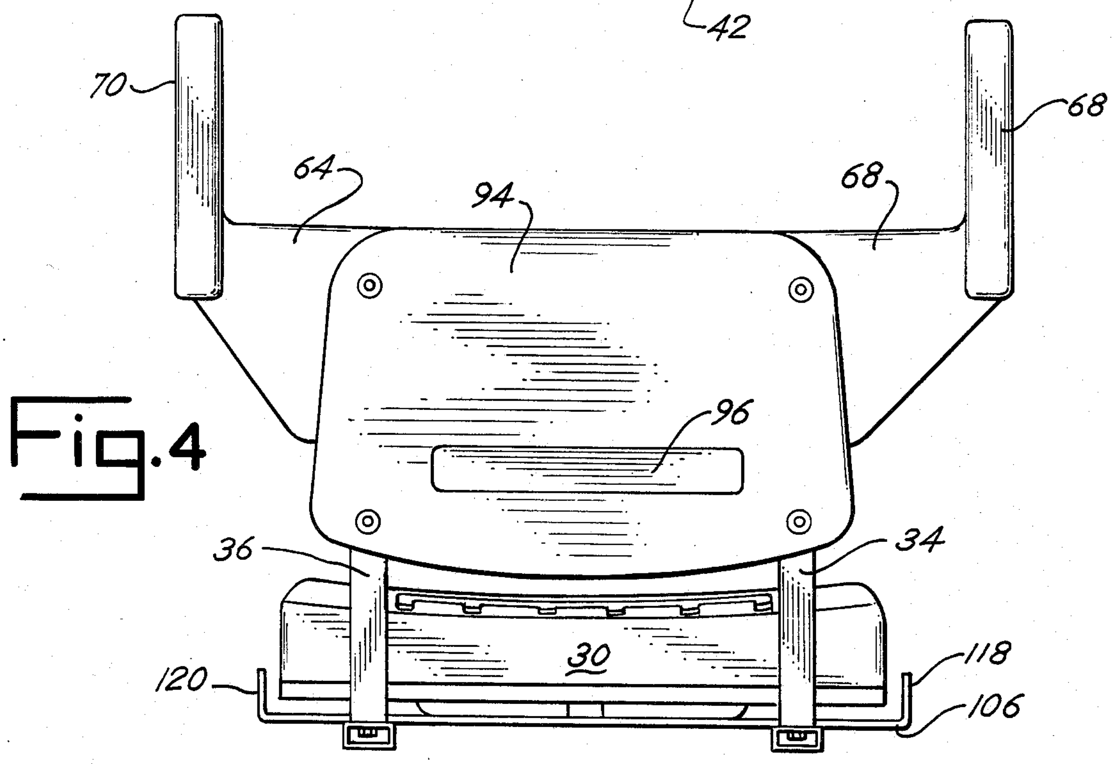
FIG. 4 is a rear elevational view of the safety seat assembly.
Figure 5:
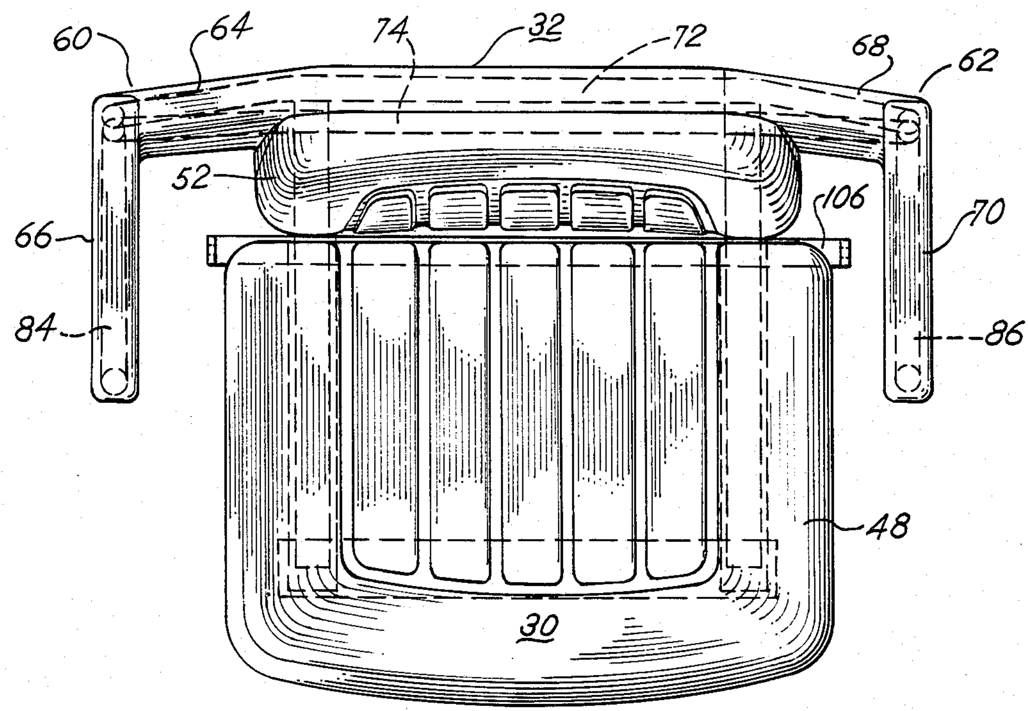
FIG. 5 is a top plan view of the safety seat assembly.
Figure 6:
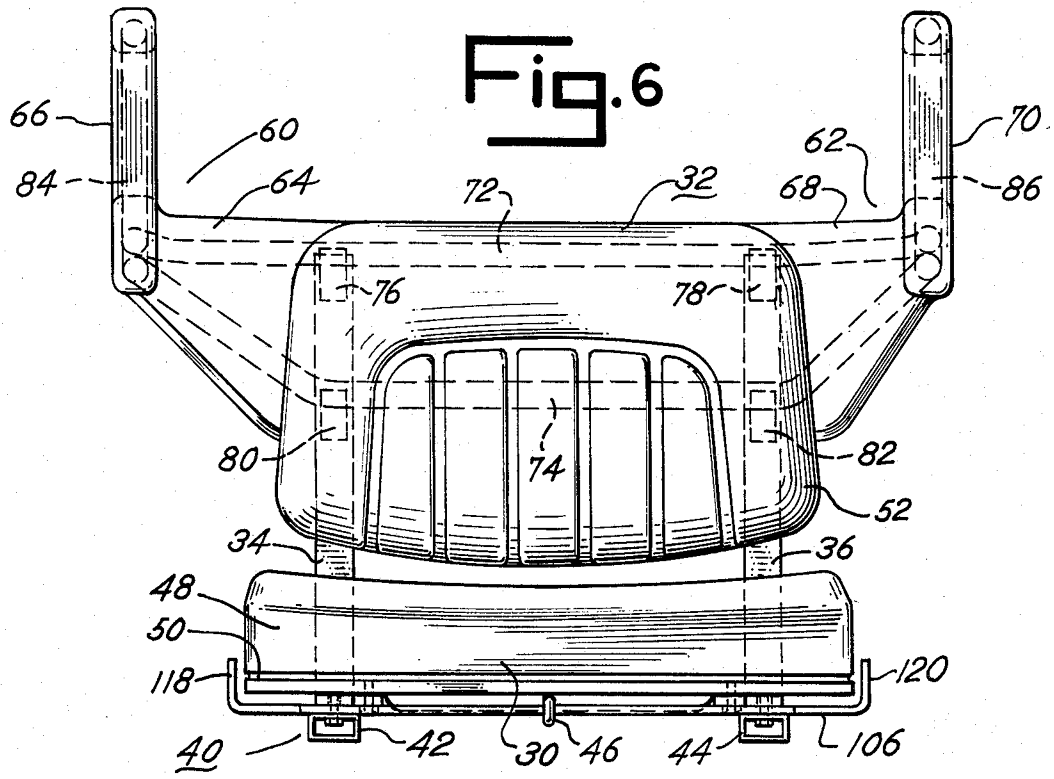
FIG. 6 is a front elevational view of the safety seat assembly.

Referring more specifically to the drawings, and to FIG. 1 in particular, numeral 10 indicates generally a forklift truck having a body 12, operator's compartment 14, an overhead guard, upright 16 with fork assembly 18 mounted thereon, and the present safety seat assembly 20 in the operator's compartment. The present invention relates to the safety seat assembly and is shown on the particular forklift truck for the purpose of illustrating the manner in which it is used by the operator shown in FIG. 1. The safety seat assembly can be adapted to a variety of different types and sizes of industrial trucks and similar vehicles, as for example trucks of the forklift type.

The safety seat assembly, shown in the drawings, to which the present invention relates, includes a seat member 30, a back support member 32 connected to the seat member by laterally spaced bars 34 and 36, the two bars extending horizontally along the bottom of the seat member and then generally upwardly into the back support member for holding the back in a fixed, essentially rigid position relative to the seat. If desired, an adjustment means (not shown) can be included for moving the back support member vertically relative to the seat. The seat is mounted on a frame 40 having two runners 42 and 44 for adjusting the seat assembly forwardly and rearwardly when a latch controlled by a handle 46 is tripped to release the latch, thereby permitting the seat assembly to slide on the runners 42 and 44. This adjustment mechanism will not be described in detail herein, since various types of suitable mechanisms are well known and can be used in connection with the present seat assembly. A cushion 48 is mounted on a base 50 and normally contains a resilient material, such as foam rubber, enclosed in a vinyl sheet layer. The back support member 32, likewise includes a cushion 52 supported on laterally spaced bars 34 and 36 and contains a resilient material, such as foam rubber, enclosed in a vinyl sheet layer.

Mounted on back support member 32 are wings 60 and 62, wing 60 consisting or a laterally extending arm 64 and a forwardly extending guard means 66, and wing 62 consisting of a laterally extending arm 68 and a forwardly extending guard means 70, the guard means 66 being rigidly secured to arm 64 and guard means 70 being rigidly secured to arm 68. The two wings are held in fixed position relative to the back support member by two horizontal bars 72 and 74, bar 72 being secured by a pair of brackets 76 and 78 to the upper ends of bars 34 and 36, and bar 74 being secured to bars 34 and 36 by brackets 80 and 82, the two bars 72 and 74 being rigidly secured to the two laterally spaced bars 34 and 36 to form a rigid frame structure for the two wings.

The two bars 72 and 74 extend laterally into arms 64 and 68 and, on the right-hand end, support a frame 84 in guard means 66 and, on the left-hand end, support a frame 86 in guard means 70. The frames 84 and 86 outline the general configuration of the guard means and are disposed near the periphery thereof, each frame being enclosed in a vinyl layer, preferably having a resilient material enclosed therein around the frame members to provide a cushioning action for the operator. The two frames 84 and 86 are formed integrally with or secured rigidly to the ends of bars 72 and 74 so that the two bars 72 and 74 and frames 84 and 86 form a rigid structure in arms 64 and 68 and guard means 66 and 70. Since this frame is secured to the laterally spaced bars 34 and 36, which in turn are rigidly secured to the seat member, a rigid seat member, back support member, and the two wings form a virtually rigid seat assembly for the operator. The guard means 66 and 70 are provided with openings 90 and 92, respectively, to provide satisfactory visibility by the operator to either side of the industrial truck without any interference from the guard means. The part of the guard means defining the opening can be used as a hand-hold by the operator in entering and leaving the truck, if he so desires.

The frame members 72 and 74 and frames 84 and 86 are preferably of round tubular construction, and normally these parts are welded together to form a rigid sub-structure. Various other shapes of material, such as a square tubular material, can be used in place of the round tubular material illustrated. The back support member preferably has a back 94 secured to the back of the cushion and is shown provided with a slot 96 for a service or instruction manual for the seat assembly and/or the vehicle. Such a symmetry of the guard means relative to the central plane of the seat assembly is important because it is standard practice in current lift truck design to offset the operator's seat to the left of the central vertical plane of the lift truck so that the operator has good visibility along the left side of the truck and has better visibility through the upright in upright designs in which the lift cylinder is center mounted. Thus, the asymmetric wing structure maintains the seat assembly within the lateral dimensions of the lift truck while at the same time providing adequate maneuvering space for the operator toward the right side of the truck so as to better enable him to turn rightward for facing rearwardly in a rightward direction for driving the truck rearwardly, and to enable him to readily reach hydraulic control levers mounted on the right side of the operator's compartment.

A belt, generally shown at numeral 100 in FIG. 1, consists of right and left parts 102 and 104 secured to a bar 106 with upturned ends, by bolts 108 and 110 extending through holes in fixtures 112 and 114 of parts 102 and 104, respectively, into the upturned ends 118 and 120 of bar 106. The safety belt, which may be considered conventional for the purpose of the present invention, is normally constructed of a web material disposed in sleeves 122 and 124 of parts 102 and 104. A latch or buckle 126 consists of two parts 128 and 130 at the respective ends of parts 102 and 104, adapted to interlock when the seat belt is placed around the operator. The seat belt may be either automatically adjustable or manually adjustable by the operator, by well known means used in the seat belt field for vehicles. The two parts can pivot on bolts 108 and 110, and the two parts 102 and 104 are sufficiently flexible that they conform to the contour of the operator when the latch 126 is locked in front of the operator.

In the use and operation of the safety seat assembly of the present invention, the operator adjusts the seat to the desired position relative to the steering wheel and other vehicle controls, and the seat belt is buckled around the front of the operator. With the operator in the seat, the two guard means 66 and 70 are spaced substantially directly laterally from the operator's upper arms, if the operator is within a wide range of a normal size adult. The upper edge of the two guard means would normally be close to the right and left shoulders of the operator and the lower edge of the guard means would normally be above the right and left elbows of the operator when the upper arms are hanging down from the shoulders. This places the heavy and strong muscle portions of the arms in a position to contact the guard means in the event of an accident or an excessively rapid maneuver by the operator of the vehicle, such that the operator's body would be thrown against the guard means. Since the upper arms are of a relatively heavy muscular structure, and the wings are padded, the operator would most likely not be injured in any way by being thrown against the wings, since the muscular portion of the arms and shoulders can readily absorb the impact against the padded guard means 66 and 70 of the two wings 60 and 62. This same protective relationship exists in the event the vehicle is accidentally turned over on either of its two sides, and since the seat belt holds the operator firmly in place in the seat, the operator is prevented from exiting or being thrown or tilted from the operator's cab. Even though his arms may be extended forwardly to the steering wheel at the time of such an accident, the heavy muscular portions of the upper arms and adjacent shoulders are in position to contact the guard means of either of the two wings to provide the necessary cushioning effect to prevent an injury to the operator.

While only one embodiment of the safety seat assembly has been described in detail herein, various changes and modifications may be made without departing from the scope of the present invention.

What is claimed is:

1. A safety seat assembly for use with industrial vehicles to keep the body of the operator within the confines of the operator's compartment area, said assembly comprising a seat member, a back support member mounted generally perpendicular to the seat member, a protective right wing extending laterally outwardly from the right side of said back support member and being rigidly connected thereto and including a forwardly extending grard means disposed on the outer end thereof, and a protective left wing extending laterally outwardly from the left side of said back support member and being rigidly connected thereto and including a forwardly extending guard means disposed on the outer end thereof, said right and left guard means being asymmetrically located in relation to the central vertical plane of the back support member.

2. A safety seat assembly as defined in claim 1 in which two laterally spaced frame members extend vertically in said back support member and each of said frame members has an extension rigidly connecting said back member to said seat member.

3. A safety seat assembly as defined in claim 2 in which two frame members extend horizontally in spaced relation to one another in said back member and are connected to and supported by said lateral frame members in said back member.

4. A safety seat assembly as defined in claim 3 in which each of said wings has a frame generally paralleling the periphery of the respective wing and connected with said horizontal members in said back support member to form a rigid structure with said horizontal members and said laterally spaced frame members.

5. A safety seat assembly as defined in claim 1 in which each of said guard means is disposed principally above the upper edge of said back support member and provide relatively broad vertical inner surfaces for contact by the upper arm portions of a vehicle operator.

6. A safety seat assembly as defined in claim 1 in which said guard means have openings extending laterally therethrough near the forward ends thereof.

7. A safety seat assembly as defined in claim 6 in which said guard means openings function to provide an operator's hand hold in getting onto the vehicle as well as to provide increased lateral visibility.

8. A safety seat assembly as defined in claim 1 in which said seat assembly is offset from the central longitudinal axis of the vehicle towards one side thereof.

9. A safety seat assembly as defined in claim 8 in which said seat assembly is offset towards the left side of the vehicle and said guard means are located so that the left guard means is more closely spaced from the operator's left upper arm than is the right guard means spaced from the operator's right upper arm.

10. A safety seat assembly as defined in claim 1 in which said right and left guard means extend to positions wherein said guard means are substantially directly outward from the upper arm portions of a normal size adult operator.

11. A safety seat assembly as defined in claim 10 in which said right and left guard means are normally located at different distances from said respective upper arm portions.

12. A safety seat assembly as claimed in claim 1 in which additional safety means is connectible across an operator's lap portion, said safety seat assembly preventing movement of the operator out of the seat assembly during any accidental lateral turn-over of the vehicle onto one side thereof.

13. A safety seat assembly as claimed in claim 12 wherein overhead guard means is mounted from the vehicle, said safety seat assembly protecting the operaor against injury during any low acceleration accidental turn-over of the vehicle onto one side thereof by preventing any attempt of the operator to exit the seat assembly during turn-over which would ordinarily cause the operator to be pinned between the vehicle supporting surface and the laterally and downwardly moving overhead guard.

14. A safety seat assembly as claimed in claim 9 in which the left and right guard means are located within the lateral dimension of the vehicle.

15. A safety seat assembly as claimed in claim 10 in which a mechanism adapted to connect said seat to a vehicle is adjustable to permit the seat assembly to be moved forwardly and rearwardly relative to the vehicle; said protective right and left wings normally maintaining a fixed relationship with the operator's upper arm portions during forward and rearward movement of the seat assembly.

16. A safety seat assembly for use with industrial vehicles to keep the body of the operator within the confines of the operator's compartment area, said assembly comprising a seat member, a back support member mounted generally perpendicular to the seat member, a protective right wing extending laterally outwardly from the right side of said back support member and being rigidly connected thereto and including a forwardly extending guard means disposed on the outer end thereof, and a protective left wing extending laterally outwardly from the left side of said back support member and being rigidly connected thereto and including a forwardly extending guard means disposed on the outer end thereof, said right and left guard means having openings extending laterally therethrough near the forward ends thereof and said guard means openings functioning to provide an operator's hand hold in getting on to the vehicle as well as to provide increased lateral visibility.

17. A safety seat assembly as claimed in claim 1 in which said right and left guard means may be the sole safety seat means in preventing operator injury during a lateral tip-over accident.

18. A safety seat assembly as claimed in claim 16 in which said right and left guard means may be the sole safety seat means in preventing operator injury during a lateral tip-over accident.

19. A safety seat assembly for use with industrial trucks to keep the body of the operator within the confines of the operator's compartment area, said industrial truck including an overhead guard structure, a telescopic upright mounted from the front end of the truck and a load support assembly mounted on the upright for vertical travel thereon, said overhead guard being adapted to protect the operator from objects which may fall from heights above the overhead guard, said safety seat assembly comprising a seat member, a back support member mounted generally perpendicular to the seat member, a protective right wing extending laterally outwardly from the right side of said back support member and being rigidly connected thereto and including a forwardly extending guard means disposed on the outer end thereof and a protective left wing extending laterally outwardly from the left side of said back support member and being rigidly connected thereto and including a forwardly extending guard means disposed on the outer end thereof, and wherein said right and left guard means may be the sole safety seat means in preventing operator injury which may be otherwise caused by the overhead guard in a lateral tip-over accident, said right and left protective wings being asymmetrically located in relation to the central vertical plane of the back support member.

20. A safety seat assembly as claimed in claim 19 wherein said right and left guard means protects the operator from injury during any accidental tip-over of the lift truck onto one side thereof by inhibiting any attempt of the operator to exist the seat assembly thereby preventing the operator from being pinned between the vehicle supporting surface and the laterally and downwardly moving overhead guard.

21. A safety seat assembly as claimed in claim 1 wherein said seat assembly is adapted particularly for use with an industrial lift truck which includes an overhead guard structure, a telescopic upright mounted from the front end of the truck and a load support assembly mounted on the upright for vertical travel thereon, said overhead guard being adapted to protect the operator from objects which may fall from the elevated load support assembly.

22. A safety seat assembly as claimed in claim 16 wherein said seat assembly is adapted particularly for use with an industrial lift truck which includes an overhead guard structure, a telescopic upright mounted from the front end of the truck and a load support assembly mounted on the upright for vertical travel thereon, said overhead guard being adapted to protect the operator from objects which may fall from heights above the overhead guard.

23. A safety seat assembly as claimed in claim 19 wherein each of said wings has an opening extending laterally therethrough near the forward ends thereof.

24. A safety seat assembly as claimed in claim 19 wherein said right and left wings are located at different distances from respective upper arm portions of a seated operator.

* * * * *